United States Patent [19]

Tajima et al.

[11] Patent Number: 5,225,471
[45] Date of Patent: Jul. 6, 1993

[54] FILLED THERMOPLASTIC RESIN COMPOSITIONS HAVING AN INTERPENETRATING PHASE FORMING A THREE-DIMENSIONAL NETWORK STRUCTURE AND MELT-BLENDING METHODS FOR FORMING THE SAME

[75] Inventors: Yoshihisa Tajima; Mitsuru Yokouchi, both of Shizuoka, Japan

[73] Assignee: Polyplastics, Co., Ltd., Osaka, Japan

[21] Appl. No.: 818,424

[22] Filed: Dec. 26, 1991

Related U.S. Application Data

[63] Continuation of Ser. No. 605,730, Oct. 31, 1990, abandoned.

[30] Foreign Application Priority Data

Nov. 1, 1989 [JP] Japan ................... 1-285632

[51] Int. Cl.⁵ ............ C08K 5/10; C08L 61/02; C08L 75/04
[52] U.S. Cl. ............................ 524/284; 524/507; 524/542; 524/589; 524/593; 525/399
[58] Field of Search .......... 524/593, 589, 507, 512, 524/542, 284; 525/398, 399

[56] References Cited

U.S. PATENT DOCUMENTS

| | | | |
|---|---|---|---|
| 4,183,845 | 1/1980 | McGee | 524/528 |
| 4,465,804 | 8/1984 | Sorensen | 524/514 |
| 4,571,319 | 5/1985 | Reske et al. | 524/424 |
| 4,703,075 | 10/1987 | Egmai | 524/269 |
| 4,780,498 | 10/1988 | Goerrissen et al. | 524/593 |
| 4,831,071 | 5/1989 | Ward et al. | 524/439 |
| 4,871,789 | 10/1989 | Martinez | 524/589 |

FOREIGN PATENT DOCUMENTS

| | | |
|---|---|---|
| 0104106 | 3/1984 | European Pat. Off. |
| 0110038 | 6/1984 | European Pat. Off. |
| 0202430 | 11/1986 | European Pat. Off. |
| 0268280 | 5/1988 | European Pat. Off. |

OTHER PUBLICATIONS

Patent Abstracts of Japan, vol. 13, No. 504, Nov. 13, 1989.
Patent Abstracts of Japan, vol. 11, No. 200, Jun. 27, 1987.

*Primary Examiner*—Paul R. Michl
*Assistant Examiner*—Tae H. Yoon
*Attorney, Agent, or Firm*—Nixon & Vanderhye

[57] ABSTRACT

Melt blended filled thermoplastic resin compositions include a thermoplastic matrix resin, a filler material and a thermoplastic additive resin. The compositions of the invention include discreet continuous phases of matrix resin and additive resin, with the filler material being present essentially entirely within the additive resin phase (i.e., essentially absent from the matrix resin phase). More specifically, the components are selected so that their respective surface tensions allow the additive resin to form a complex three-dimensional interpenetrating network structure within the matrix resin when melt-blended, and such that essentially all of the filler material is homogeneously dispersed throughout the formed three-dimensional network structure.

8 Claims, 3 Drawing Sheets

FILLED THERMOPLASTIC RESIN COMPOSITIONS HAVING AN INTERPENETRATING PHASE FORMING A THREE-DIMENSIONAL NETWORK STRUCTURE AND MELT-BLENDING METHODS FOR FORMING THE SAME

This is a continuation of application Ser. No. 07/605,730, filed Oct. 31, 1990, now abandoned.

FIELD OF THE INVENTION

The present invention generally relates to melt-blended thermoplastic resin compositions which include a filler material (i.e., "filled" resin compositions). More specifically, the present invention relates to filled thermoplastic resin compositions in which a thermoplastic resin additive forms an interpenetrating network structure within a thermoplastic matrix resin, whereby the filler is homogeneously dispersed throughout the network structure. The present invention is also directed to methods of forming thermoplastic interpenetrating network structures homogeneously within a thermoplastic matrix resin using melt-blending techniques.

BACKGROUND AND SUMMARY OF THE INVENTION

It is known that high-molecular weight thermoplastic polymers have been used as matrix resins and may be modified (e.g. to improve and/or impart desired physical properties to the polymers) by incorporating other additive materials thereinto. Representative examples of additive materials that have been incorporated into thermoplastic matrix resin include non-thermoplastic fillers (e.g., so as to reinforce the polymer) and thermoplastic additive resins (e.g., so as to modify the heat resistance, impact resistance, chemical resistance and/or surface gloss characteristics of the matrix resin). Furthermore, attempts have been made in the past to enhance the blending efficiency and/or homogeneity of resulting melt-blended resin compositions. For example, various techniques such as compatibilization, dynamic vulcanization and reaction extrusion have been proposed with a view towards enhancing the manner in which resin components may be blended with one another so as to achieve desired property modifications.

In order to obtain desired effects, thermoplastic additive resins have typically been incorporated into matrix resins in relatively large amounts so as to improve thermal and mechanical properties. However, using thermoplastic additive resins in such large amounts inevitably affects other desired physical properties adversely. Attempts have therefore been made to improve the mechanical properties of matrix resin through formation of an interpenetrating three-dimensional network structure using lesser amounts of additive resin. However, in order to form a three-dimensional network, it has typically been necessary to employ specialized and relatively complex processing techniques. For example, three-dimensional networks of an additive resin in a matrix resin have been formed by simultaneously polymerizing the matrix resin monomer and the additive resin monomer. Similarly, preliminary polymerization of one of the matrix or additive resin monomers to a desired extent followed by polymerization of both monomer components or chemical reaction utilizing a functional group have been employed.

There is therefore no known post-polymerization technique in the art for forming a thermoplastic interpenetrating three-dimensional network structure using small amounts of the additive resin. It is towards achieving such a technique that the present invention is directed.

Broadly, the present invention is directed to forming filled resin compositions having a first continuous phase comprised of a thermoplastic matrix resin, and a second continuous phase comprised of (a) a thermoplastic additive resin dispersed homogeneously throughout the matrix resin in the form of an interconnected three-dimensional network, and (b) a filler material homogeneously dispersed through the interconnected three-dimensional network. As a result of the interpenetrating three-dimensional network that is formed, the thermoplastic additive and filler may be employed in lesser quantities as compared to melt-blended filled thermoplastic compositions of the prior art while achieving comparable (and usually improved) property enhancements. Thus, the problems typically associated with incorporating relatively large amounts of additive resin within a matrix resin as described briefly above have been minimized (if not alleviated) according to the present invention.

The present invention more specifically relates to forming a melt-blended filled thermoplastic resin composition by selecting the thermoplastic matrix resin and the filler material such that one exhibits a higher surface tension during melt blending as compared to the other. On the other hand, the thermoplastic additive is selected such that it exhibits a surface tension during melt-blending that is an intermediate value between the higher and lower surface tension values of the thermoplastic matrix resin and the filler. In other words, the surface tension values $\delta_1$, $\delta_2$, $\delta_3$ during melt-blending of the thermoplastic matrix resin, the filler material, and the thermoplastic additive, respectively, are each selected so as to satisfy the relationships:

$$\delta_1 < \delta_3 < \delta_2;$$

or $$\delta_1 < \delta_3 < \delta_2.$$

Further aspects and advantages of the invention will become more clear after careful consideration is given to the following detailed description thereof.

BRIEF DESCRIPTION OF THE ACCOMPANYING DRAWINGS

Reference will hereinafter be made to the accompanying drawings wherein like reference numerals throughout the various FIGURES denote like elements, and wherein.

DETAILED DESCRIPTION OF THE PREFERRED EXEMPLARY EMBODIMENTS

Figure 1A:
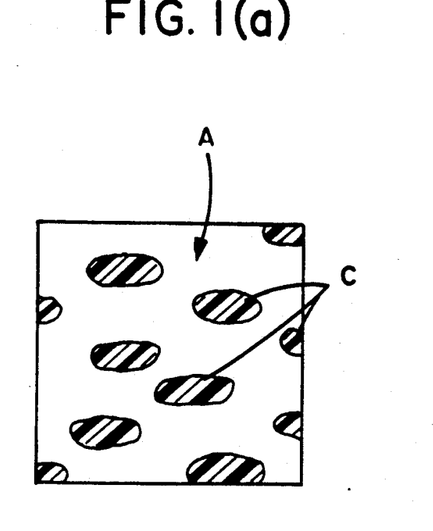
FIGS. 1(a) and 1(b) are schematic cross-sectional and perspective views, respectively, showing a typical particulate dispersion of a thermoplastic additive within a thermoplastic matrix resin according to the prior art.
Figure 1B:
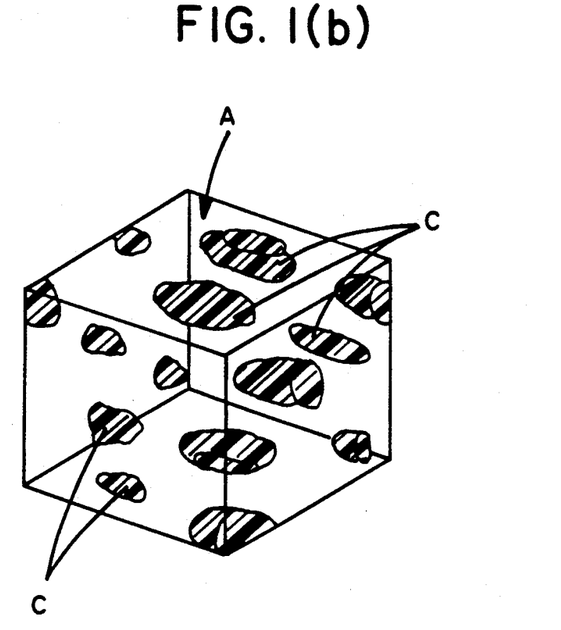
Figure 2A:
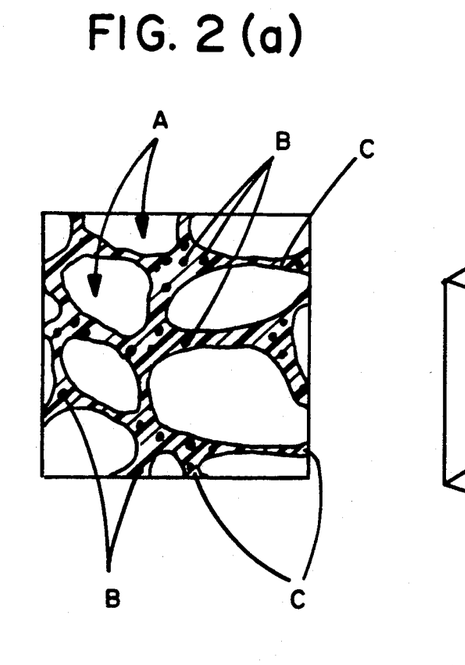
FIGS. 2(a) and 2(b) are a schematic cross-sectional and perspective views, respectively, showing a typical particulate dispersion of a thermoplastic additive and filler component within a thermoplastic matrix reins according to the present invention.
Figure 2B:
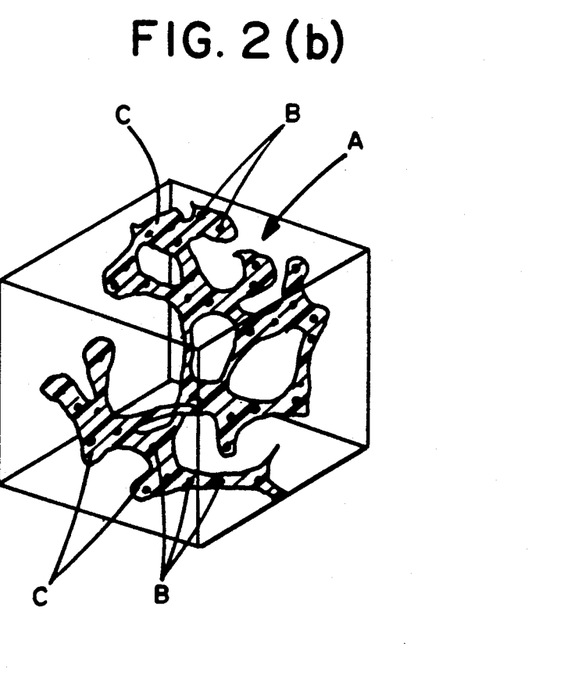

Accompanying FIG. 1 shows the particle dispersion morphology in conventional polymer blend system. In this regard, it can be seen that the additive resin (component C) is dispersed in the form of discreet unconnected particles or islands in a sea of matrix resin (component A). The additive resin is moreover, present in relatively low amounts (20% by weight based on total composition weight). On the other hand, accompanying FIGS. 2(a) and 2(b) schematically shows the morphology of the interpenetrating network structure according to the present invention. As can be seen, the filler material (component B) is essentially entirely encapsulated within the three-dimensional interconnected network formed by the thermoplastic additive resin (component C). Despite the relatively low content (e.g. 20% by weight of the composition), the additive resin C forms a continuous phase within the continuous phase of the matrix resin (component A). Thus, the additive resin C forms a complex interpenetrating network structure in which the continuous phases of both the additive resin and the matrix resin are entangled with one another.

As used herein and in the accompanying claims, the terms "network", "network structure", and like terms are each intended to refer to a melt-blended resin morphology having at least two continuous phases, whereby one phase is comprised of a thermoplastic matrix resin, and the other phase is comprised of imbedded regions of a thermoplastic additive resin within the matrix resin, which imbedded regions are interconnected by means of fibrils, rivulets or the like of the additive resin. Thus, it will be appreciated that both phases will form an entangled three-dimensional network.

The compositions of this invention are at least tertiary blends. That is, according to the present invention at least three components—that is, a thermoplastic matrix resin A, a filler material B, and a thermoplastic additive resin C are melt-blended to disperse the additive resin in the matrix resin in such a manner that a complex three-dimensional network is formed, and in such a manner that the additive resin encapsulates essentially all of the filler material. In this manner, the non-thermoplastic additive is dispersed homogeneously throughout the matrix resin without physically being encapsulated or imbedded thereby. In other words, the non-thermoplastic particles interconnected with one another through the three-dimensional network formed by the additive resin.

The present invention utilizes surface tension differences among the three components A, B and C (i.e., the thermoplastic matrix resin, the filler material and the thermoplastic additive resin, respectively) so that the additive resin encapsulates the filler material, and so that the filler material is homogeneously dispersed throughout the additive resin (i.e., is essentially absent from the matrix resin phase). Specifically, selection of the components A, B and C such that the surface tension of the component C is intermediate of the surface tensions of both components A and B (i.e., as described above) enables the particles of component B to be encapsulated by the three-dimensional network that is formed by the component C.

It is believed that the phenomenon described above occurs due to the fact that the surface free energy of each component per unit volume is less in the state whereby the component C encapsulates the component B as compared to other states that the components may assume. As a result, the system will seek its most stable form—i.e., the component C will encapsulate component B. Thus, the mechanism whereby the component B is encapsulated by the component C is due to the surface tension differences of the components in the system. More specifically, when there is a difference in the surface tension between the components B and C, as described above, the system will assume a state whereby the component C encapsulates the component B so as to achieve the most stable form (i.e., minimize the surface free energy).

Even with minimal surface tension differences, the system will assume its most stable state wherein the component C encapsulates the component B when it is left to stand for prolonged time periods. However, in an actual commercial process, since the melt-blending time is limited and since there are a number of melt-blending techniques that could be employed, a significantly larger surface tension difference is preferred so that the system assumes the most stable state within a reasonably short time. In this regard, it is particularly preferred that the surface tension difference between the components A and C, and between the components B and C each be at least 2 dyn/cm or more.

There is no particular limitation on the thermoplastic resin as the component A, and examples thereof include polyolefins such as polyethylene and polypropylene, aromatic polyesters comprising either an aromatic dicarboxylic acid and diol, such as polyethylene terephthalate and polybutylene terephthalate, or a hydroxy carboxylic acid; polyacetal (homopolymer and copolymer); polystyrene; polyvinyl chloride; polyamide; polycarbonate; ABS; polyphenylene oxide; polyphenylene sulfide; fluororesin; acrylic resin, and thermoplastic polyurethane resin.

The filler material as component B can be virtually any fibrous, particulate or flaky inorganic or organic filler typically employed in engineering resins and may be selected in dependence upon the compositions' intended end use application and/or intended properties to be attained through the use of the filler.

Specific examples of inorganic fibrous filler material include fibers of glass, asbestos, silica, silica-alumina, zirconia, boron nitride, silicon nitride, boron and potassium titanate. Examples of particulate filler materials include carbon black, graphite, silica, quartz powder, glass bead, milled glass fiber, glass balloon, glass powder, silicates such as calcium silicate, aluminum silicate, kaolin, talc, clay, diatomaceous earth and wollastonite, metallic oxides such as iron oxide, titanium oxide, zinc oxide, antimony trioxide and alumina, metal carbonates such as calcium carbonate and magnesium carbonate, metal sulfates such as calcium sulfate and barium sulfate, and other various materials such as ferrite, silicon carbide, silicon nitride and boron nitride. Examples of the flaky filer include mica and glass flake. These inorganic fillers may be used alone or in a combination of two or more of them.

Examples of the organic filler materials include heat-resistant fibrous fillers, such as the fibers of aromatic polyesters, liquid crystal polymers, aromatic polyamides, and aromatic polyimides, and particulate fillers comprising thermoplastic resins, thermosetting resins or the like. Examples of particulate organic fillers include phenolic resins, polystyrene resins, acrylic resins, polyethylene resins, polyamide resins, fluororesins, melamine resins, polymethyl methacrylate resins, epoxy resins, olefin-acrylic acid copolymer resins or the like. These particulate organic filler materials may be used alone or in combination of two or more of the same. Although there is no particular limitation on the particle size of the filler materials (either organic or inorganic) that are employed, the mean particle diameter is preferably between 0.01 to 20μm so as to be more readily dispersed when melt-blended.

The thermoplastic additive resin as the component C may be virtually any thermoplastic resin that can be selected for its surface tension properties (i.e. so as to form a three-dimensional network which encapsulates the filler material) and which imparts the desired property modification to the resulting composition. Thus, the thermoplastic additive resin may include any of the thermoplastic resins exemplified above as the matrix resin component A, in addition to low-molecular weight oligomer compounds, e.g., glycols, polyolefins, silicone oils, and silicone rubbers. Of course, since the surface tension of the additive resin must be different from the surface tension of the matrix resin as described above, these two resins cannot be identical to one another in that respect. In other words, the additive resin and the matrix resin could be chemically similar to one another (e.g., belong to the same general class of resins), provided that their respective surface tensions satisfy the relationships previously described.

There is no particular limitation on the blending ratio of the components A, B and C. However, when consideration is given to the object of the present invention (i.e., the provision of a thermoplastic interpenetrating network structure having a low content of the component C), a the total amount of the components B and C is preferably 60% by weight or less, particularly 40% by weight or less based on the total weight of the components A, B and C. A large weight ratio of component C to component B is also preferred so as to ensure that the component B is essentially entirely encapsulated within component C. In this regard, the most desirable blending ratio is one falling within the weight ratio ranges specified by the following:

| | |
|---|---|
| (B + C)/(A + B + C) = | between 0.03 to 0.6; and |
| C/(B + C) = | between 0.05 to 0.95. |

It is the surface tension of thermoplastic resins during melt-blending which is important for purposes of the present invention. For this reason, surface tensions of thermoplastic resins are evaluated by the well known "pendant drop method" at the melt-blending temperature. The term "pendant drop method" used herein is intended to mean a method which comprises standing a tube upright, and determining the surface tension of a liquid placed in the tube based upon the shape of a droplet hanging down from the end of the tube. In the case of components which do not melt at the melt-blending temperature (e.g., filler materials), the critical surface tension as determined by the Zisman plot of the contact angle was used in the evaluation.

In the present invention, the three components, i.e., components A, B and C, may be melt-blended by customary methods which include melt kneading the thermoplastic matrix resin A with the thermoplastic additive resin C while simultaneously adding the filler component B thereinto. That is, the present invention is especially significant in that a thermoplastic interpenetrating network structure can be formed using conventional melt-blending techniques and thus specialized methods and/or techniques associated with the prior art are unnecessary. It is desirable to conduct the melt-blending at melting temperatures for the thermoplastic components such that a shear force of at least 10 sec$^{-1}$ is imparted to the resin melt. The shear force is more preferably 10 to 1000 sec$^{-1}$, and usually will be between 50 to 500 sec$^{-1}$.

Conventional additives known in the art, e.g., lubricants, nucleating agents, dyes and pigments, mold-release agents, antioxidants, heat stabilizers, weather (light) stabilizers, reinforcing agents, hydrolysis stabilizers, thermoplastic resins, etc., may be incorporated into the thermoplastic interpenetrating network structure of the present invention for the purpose of imparting desired characteristics.

According to the method of the present invention, since a thermoplastic interpenetrating network structure can conveniently be formed by blending the matrix resin with a lesser amount of additive resin, it is possible to improve the properties of the matrix resin without detriment to its other desirable properties. Various properties, such as mechanical, physical and chemical properties, can be improved depending upon the purpose of use of the thermoplastic interpenetrating network structure, which renders the present invention widely useful.

EXAMPLES

The present invention will now be described in more detail by way of the following non-limiting Examples.

EXAMPLE 1

A polyacetal resin (Duration: a product of polyplastics Co., Ltd.), a thermoplastic polyurethane (adipate polyurethane; a product of Nippon Miractran Co., Ltd.) and acrylic rubber particles (particle diameter of 0.5μm; a product of Mitsubishi Rayon Co., Ltd.) respectively having surface tensions as specified in Table 1 were mixed with each other in proportions as specified in Table 1 and kneaded at a preset temperature of 190° C. by means of a 30-mm twin extruder at a screw rotational speed of 80 rpm (a shearing rate of 100 sec$^{-1}$) to pelletize the mixture. Subsequently, a tensile specimen was prepared from the pellets by using a molding machine manufactured by Nissei Plastic Industrial Co., Ltd. at a barrel temperature of 190° C. and a mold temperature of 80° C., and the molding was evaluated. The results are given in Table 1.

The following evaluation techniques were employed:
(i) Surface Tension Measurements The surface tension of each of the polyacetal resin and the thermoplastic resin polyurethane was measured according to the pendant drop method (a method described on pages 78 and 79 of "Shin Jikken Kagaku Koza", Vol. 18, "Kaimen to Koroido" (1977) published by Maruzen Co., Ltd. incorporated expressly hereinto by reference in an atmosphere of 190° C. by making use of an automatic surface tensio-meter PD-Z manufactured by Kyowa Interface Science Co., Ltd. The surface tensions of the polyacetal resin and the thermoplastic resin polyurethane were 21 dyn/cm and 36 dyn/cm, respectively.

Figure 3:
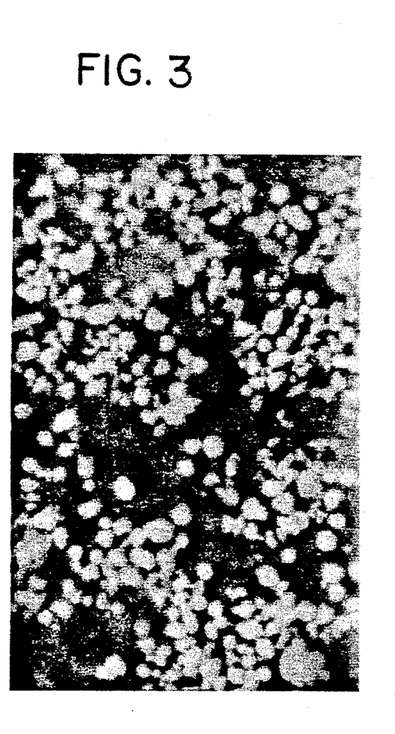
FIG. 3 is an optical microphotograph showing the particulate structure of a molded article formed of the resin composition described in the following Comparative Example 1.

The surface tension of the acrylic rubber particles was measured by fabricating the acrylic rubber particles into a film at 200° C. by using a press and determining the critical surface tension and the temperature coefficient according to the contact angle method (a method described on pages 93 and 106 of "Shin Jikken Kagaku Koza", Vol. 18, "Kaimen to Koroido" (1977) published by Maruzen Co., Ltd.) by making use of an automatic contact angle measuring apparatus CA-Z manufactured by Kyowa Interface Science Co., Ltd. The results of the measurements were as follows. The value on the acrylic rubber particle at 190° C. in terms of the surface tension was 38 dyn/cm.

surface tension at 25° C.: 47 dyn/cm
surface tension at 60° C.: 45 dyn/cm
surface tension at 80° C.: 44 dyn/cm
temperature gradient $(-dr/dT) = 0.05$ (ii) Determining Presence of Interpenetrating Network Structure A molded piece having a size of $10 \times 10 \times 3$ mm was placed in a hydrochloric acid-methanol solution (32 N hydrochloric acid : methanol = 1:3 (vol)) and heated under reflux at 80° C. for 12 hr to observe the morphological change with the naked eye and under an optical microscope and an electron microscope. Specifically, the matrix resin comprising a polyacetal resin was decomposed with an acid and eluted, and the dispersion state was observed for the thermoplastic polyurethane and the acrylic rubber particle which will not bring about any morphological change under this condition. As with the prior art, if the thermoplastic polyurethane is dispersed in particulate form, the molded piece cannot retain its form and a (fine) particulate polyurethane is observed with the naked eye or under an optical microscope (see the optical microphotograph of Comparative Example 3 shown in FIG. 3).

Figure 4:
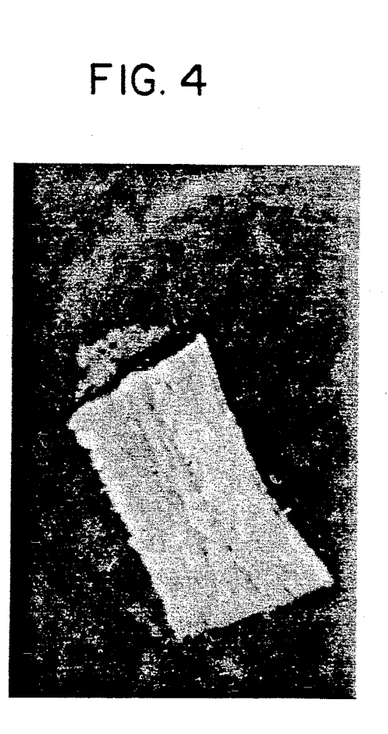
FIG. 4 is an optical microphotograph of a molded article formed of the resin composition described in the following Example 1.
Figure 5:
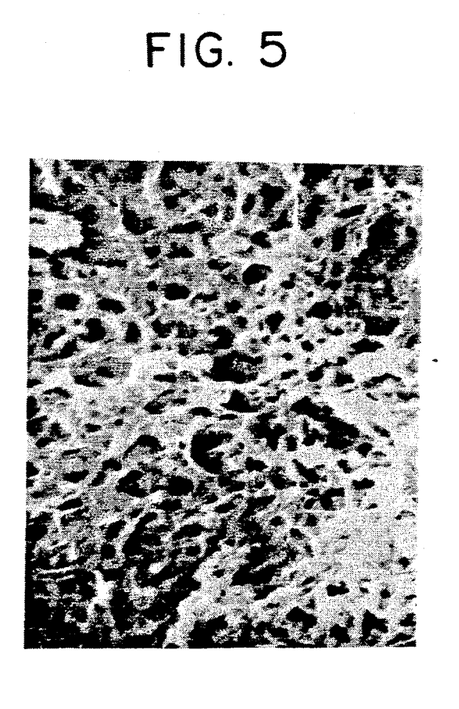
FIG. 5 is a scanning electron microscope showing the interpenetrating continuous phase of the thermoplastic additive within a thermoplastic matrix resin for the composition of the following Example 1.

By contrast, when the thermoplastic resin and the acrylic rubber assume a thermoplastic interpenetrating network structure according to the present invention, the molded piece retains its form and is observed with the naked eye or under an optical microscope (see an optical microphotograph of example 1 shown in FIG. 4). Further, the thermoplastic interpenetrating network structure can be more distinctly confirmed when the molded piece is observed in a magnified state under a scanning electron microscope (see an electron microphotograph of Example 1 shown in FIG. 5).

The morphology of the particulate dispersion and the thermoplastic interpenetrating network structure were quantitatively evaluated by treating the molded piece by the above-described method, filtering the treated piece through a 12-mesh sieve to determine the oversize (% by weight). The portion of particulate dispersion passes through the sieve and does not remain on the sieve. The portion of the thermoplastic interpenetrating network structure however remains on the sieve. Therefore, the oversize (% by weight) refers to the weight of the (B+C) portion in the thermoplastic interpenetrating network structure.

(iii) Mechanical Strength Measurement

The Izod impact strength (notched) of the molded piece was measured according to ASTM D 256, while the tensile strength and tensile elongation thereof were measured according to ASTM D638.

COMPARATIVE EXAMPLE 1

A molded piece was prepared and evaluated in the same manner as that of Example 1. except that no acrylic rubber particle was added and the amount of blending of the thermoplastic polyurethane was 20% by weight. The results of evaluation are given in Table 1.

Examples 2 and 3 and Comparative Examples 2 to 3:

A molded piece was prepared and evaluated in the same manner as that of Example 1, except that a melamine resin particle (a particle diameter of 0.3 to 25 μm; a product of Nippon Shokubai Kagaku Kogyo Co., Ltd), calcium carbonate (a particle diameter of 5 μm; a product of Toyo Fine Chemical Co., Ltd.), a polydimethylsiloxane particle (a particle diameter of 1 to 15 μm; a product of Toray Silicone Co., Ltd.), and polytetrafluoroethylene (a particle diameter of 0.3 μm; a product of Daikin Kogyo Co., Ltd.) were used instead of the acrylic rubber particle. The results of evaluation are given in Table 1.

EXAMPLES 4 TO 9 AND COMPARATIVE EXAMPLES 4 to 7

A molded piece was prepared and evaluated in the same manner as that of Example 1, except that a thermoplastic polyurethane was used as the thermoplastic compound C and the blending ratio was varied as specified in Table 2. The results of evaluation are given in Table 2.

EXAMPLE 10 AND COMPARATIVE EXAMPLE 8 AND 9

A molded piece was prepared and evaluated in the same manner as that of Example 1, except that the thermoplastic resin A . thermoplastic compound C and filler B were a polybutylene terephthalate resin, polymethyl methacrylate and an acrylic rubber particle or a high-molecular weight polyethylene particle, respectively. The results of evaluation are given in Table 3.

EXAMPLE 11 and COMPARATIVE EXAMPLE 10

A molded piece was prepared and evaluated in the same manner as that of Example 1 except that the thermoplastic resin A, a thermoplastic compound C and filler B were a polybutylene terephthalate resin, a polyethylene resin and a polytetrafluoroethylene particle, respectively. The results of evaluation are given in Table 4.

TABLE 1

|  | Surface tension (dyn/cm) | Ex. No. | | | Comp. Ex. No. | | |
| --- | --- | --- | --- | --- | --- | --- | --- |
|  |  | 1 | 2 | 3 | 1 | 2 | 3 |
| A polyacetal resin | 21 (wt %) | 80 | 80 | 80 | 80 | 80 | 80 |
| C thermoplactic polyurethane | 36 (wt %) | 16 | 16 | 16 | 20 | 16 | 16 |

TABLE 1-continued

| | Surface tension (dyn/cm) | Ex. No. 1 | Ex. No. 2 | Ex. No. 3 | Comp. Ex. No. 1 | Comp. Ex. No. 2 | Comp. Ex. No. 3 |
|---|---|---|---|---|---|---|---|
| B | | | | | | | |
| acrylic rubber particle | 38 (wt %) | 4 | | | | | |
| melamine resin particle | 43 (wt %) | | 4 | | | | |
| calcium carbonate particle | 65 (wt %) | | | 4 | | | |
| polydimethylsiloxane particle | 10 (wt %) | | | | | 4 | |
| polytetrafluoroethylene particle | 9 (wt %) | | | | | | 4 |
| properties | | | | | | | |
| morphological change | | no | no | no | dispersed | dispersed | dispersed |
| oversize (wt %) | | 19 | 19 | 17 | 0 | 0 | 0 |
| notched Izod imapct strength (kgfcm/cm) | | 15.2 | 13.8 | 11.2 | 8.1 | 6.5 | 6.1 |
| tensile strength (kg/cm$^2$) | | 484 | 483 | 468 | 485 | 482 | 486 |
| tensile elongation (%) | | ≦300 | ≦300 | ≦300 | 120 | 100 | 92 |

TABLE 2

| | Surface tension (dyn/cm) | Ex. No. 4 | Ex. No. 5 | Ex. No. 6 | Ex. No. 7 | Ex. No. 8 | Ex. No. 9 | Comp. Ex. No. 4 | Comp. Ex. No. 5 | Comp. Ex. No. 6 | Comp. Ex. No. 7 |
|---|---|---|---|---|---|---|---|---|---|---|---|
| A polyacetal resin | 21 (wt %) | 95 | 95 | 95 | 60 | 60 | 60 | 95 | 95 | 60 | 60 |
| C thermoplastic polyurethane | 36 (wt %) | 4.5 | 3.75 | 1.25 | 36 | 30 | 4 | 5 | | 40 | |
| B acrylic rubber particle | 38 (wt %) | 0.5 | 1.25 | 3.75 | 4 | 10 | 36 | | 5 | | 40 |
| properties | | | | | | | | | | | |
| morphological change | | no | no | no | no | no | no | dispersed | dispersed | dispersed | dispersed |
| oversize (wt %) | | 2.1 | 4.5 | 1.5 | 73 | 47 | 15 | 0 | 0 | 91 | 0 |
| notched Izod impact strength (kgfcm/cm) | | 9.8 | 21.5 | 9.3 | 41 | 84 | 8.5 | 7.3 | 6.9 | 25.0 | 6.6 |
| tensile strength (kg/cm$^2$) | | 612 | 605 | 608 | 305 | 307 | 304 | 611 | 610 | 305 | 303 |
| tensile elongation (%) | | 110 | 135 | 94 | ≦300 | ≦300 | ≦300 | 52 | 50 | ≦300 | 180 |

TABLE 3

| | Surface tension (dyn/cm) | Ex. No. 10 | Comp. Ex. No. 8 | Comp. Ex. No. 9 |
|---|---|---|---|---|
| A polyacetal resin | 34 (wt %) | 90 | 90 | 90 |
| C polymethyl methacrylate | 36 (wt %) | 8 | 10 | 8 |
| B | | | | |
| acrylic rubber particle | 37 (wt %) | 2 | | |
| high-molecular weight polyethylene particle | 28 (wt %) | | | 2 |
| properties | | | | |
| morphological change | | no | dispersed | dispersed |
| oversize (wt %) | | 9.4 | 0 | 0 |
| notched Izod impact strength (kfgcm/cm) | | 7.1 | 6.4 | 5.2 |
| tensile strength (kg/cm$^2$) | | 528 | 527 | 522 |
| tensile elongation (%) | | 80 | 25 | 25 |

TABLE 4

| | Surface tension (dyn/cm) | Ex. No. 11 | Comp. Ex. No. 10 |
|---|---|---|---|
| A polybutylene terephthalate resin | 34 (wt %) | 90 | 90 |
| C polyethylene resin | 27 (wt %) | 8 | 10 |
| B polyetetrafluoroethylene particle | 9 (wt %) | 2 | |
| properties | | | |

TABLE 4-continued

| | Surface tension (dyn/cm) | Ex. No. 11 | Comp. Ex. No. 10 |
|---|---|---|---|
| morphological change | | no | dispersed |
| oversize (wt %) | | 9.8 | 0 |
| notched Izod impact strength (kgfcm/cm) | | 6.3 | 5.1 |
| tensile strength (kg/cm$^2$) | | 496 | 496 |
| tensile elongation (%) | | 90 | 28 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming within a thermoplastic polyacetal matrix resin an interconnected network consisting essentially of a continuous phase of a thermoplastic polyurethane additive which encapsulates a particulate acrylic filler material, said method comprising the steps of:

(a) selecting a thermoplastic polyacetal matrix resin and a particulate acrylic filler material such that surface tensions of each during melt-blending differ from one another by a predetermined value so as to establish lower and upper surface tension value respectively, (b) selecting a thermoplastic polyurethane additive resin such that it exhibits a surface tension value during melt-blending that is intermediate of, and differs by at least 2.0 dyne/cm from, said lower and upper surface tension values exhibited by said thermoplastic polyacetal matrix resin and said particulate acrylic filler material, and then (c) melt-blending the thermoplastic polyurethane additive and particulate acrylic filler material with said thermoplastic polyacetal matrix resin, whereby said thermoplastic polyurethane additive resin encapsulates said particulate acrylic filler material in the form of a continuous phase interconnected network within said thermoplastic matrix resin, wherein step (c) is practiced such that the amounts of said polyacetal matrix resin, said particulate acrylic filler material and said polyurethane additive resin are melt-blended to obtain (1) a ratio of the weight of the polyurethane additive resin to the total weight of the polyurethane resin and the particulate acrylic filler material is between about 0.05 to 0.95, and (2) a ratio of the total weight of the particulate acrylic filler material and the polyurethane additive resin to the total composition weight of the particulate acrylic filler material, the polyurethane additive resin, and the polyacetal matrix resin, is between 0.03 to 0.60; and wherein said melt-blending is conducted at melt temperature for the thermoplastic polyacetal resin and the polyurethane additive resin to impart a shear force thereto of between 50 to 500 sec$^{-1}$.

2. A method as in claim 1, wherein the particulate acrylic filler material has an average particle size of between 0.01 μm to 20 μm.

3. A method as in claim 1, wherein the total weight of the additive resin and the filler is 60% or less.

4. A method of making a melt-blended thermoplastic polyacetal resin composition which includes a thermoplastic polyacetal matrix resin, a thermoplastic polyurethane additive resin and a particulate acrylic filler having a particle size of between 0.01 μm to 20 μm, which method comprises:

forming a three-dimensional network of said thermoplastic polyurethane additive resin within said thermoplastic polyacetal matrix resin, and homogeneously dispersing and encapsulating said particulate acrylic filler within said formed three-dimensional network, and wherein said steps of forming said three-dimensional network and homogeneously dispersing and encapsulating said particulate acrylic filler within said three-dimensional network includes the steps of;

(i) selecting said thermoplastic polyacetal matrix resin and said particulate acrylic filler such that said particulate acrylic filler exhibits a higher surface tension during melt-blending and said thermoplastic polyacetal matrix resin exhibits a lower surface tension during melt-blending;

(ii) selecting said thermoplastic polyurethane additive resin such that it exhibits a surface tension value during melt-blending that is intermediate of, and differs by at least 2.0 dyne/cm from, said lower and higher surface tensions exhibited by said thermoplastic polyacetal matrix resin and said particulate acrylic filler, respectively, and then (iii) melt-blending the thermoplastic polyurethane additive resin and said particulate acrylic filler with said thermoplastic polyacetal matrix resin, wherein said step of melt-blending is practiced such that the amounts of said polyacetal matrix resin, said particulate acrylic filler material and said polyurethane additive resin are melt-blended to obtain (1) a ratio of the weight of the polyurethane additive resin to the total weight of the polyurethane additive resin and the particulate acrylic filler is between about 0.05 to 0.95, (2) a ratio of the total weight of the particulate acrylic filler and the polyurethane additive resin to the total composition weight of the particulate acrylic filler, the polyurethane additive resin, and the polyacetal matrix resin, is between 0.03 to 0.60, and (3) the total weight of the additive resin and the filler is 60% or less; and wherein said melt-blending is conducted at melt temperatures for the thermoplastic polyacetal resin and the polyurethane additive resin to impart a shear force thereof of between 50 to 500 sec$^{-1}$.

5. A melt-blended polyacetal resin composition comprising:

(A) a thermoplastic polyacetal matrix resin,
(B) a particulate acrylic filler material, and
(C) a thermoplastic polyurethane additive resin, wherein said thermoplastic polyurethane additive resin is homogeneously dispersed in a continuous phase throughout said thermoplastic polyacetal matrix resin in the form of an interconnected three-dimensional network, and wherein essentially all of said particulate acrylic filler material is homogeneously dispersed throughout said continuous phase of said thermoplastic polyurethane additive resin, wherein said particulate acrylic filler material exhibits a higher surface tension during melt-blending and said thermoplastic polyacetal matrix resin exhibits a lower surface tension during melt-blending, and wherein said thermoplastic polyurethane additive resin exhibits a surface tension value during melt-blending that is intermediate of, and differs by at least 2.0 dyne/cm from, said lower and higher surface tensions exhibited by said thermoplastic polyacetal matrix resin and said particulate acrylic filler, respectively, and wherein said polyacetal matrix resin, said particulate acrylic filler material and said polyurethane additive resin are present in amounts such that (1) a ratio of the weight of the polyurethane additive resin to the total weight of the polyurethane additive resin and the particulate acrylic filler material is between about 0.05 to 0.95, and (2) a ratio of the total weight of the particulate acrylic filler material and the polyurethane additive resin to the total composition weight of the particulate acrylic filler material, the polyurethane additive resin, and the polyacetal matrix resin, is between 0.03 to 0.60.

6. A melt-blended polyacetal resin composition comprising:

a first continuous phase comprised of a thermoplastic polyacetal matrix resin, and a second continuous phase comprised of (a) a thermoplastic polyurethane additive resin dispersed homogeneously throughout said thermoplastic polyacetal matrix resin in the form of an interconnected three-dimensional network structure, and (b) a particulate acrylic filler material having a particle size of between 0.01 μm to 20 μm dispersed homogeneously throughout said interconnected three-dimensional network structure formed by said thermoplastic polyurethane additive resin, wherein essentially all of said particulate acrylic filler material is present in said second continuous phase and is thereby essentially absent from said first continuous phase, wherein the surface tension value of said thermoplastic polyurethane additive resin during melt-blending differs by at least 2.0 dyne/cm from the surface tension values for each of said thermoplastic polyacetal matrix resin and said particulate acrylic filler material, and wherein said polyacetal matrix resin, said particulate acrylic filler material and said polyurethane additive resin are present in amounts such that (1) a ratio of the weight of the polyurethane additive resin to the total weight of the polyurethane additive resin and the particulate acrylic filler material is between about 0.05 to 0.95, (2) a ratio of the total weight of the particulate acrylic filler material and the polyurethane additive resin to the total composition weight of the particulate acrylic filler material, the polyurethane additive resin, and the polyacetal matrix resin, is between 0.03 to 0.60, and (3) the total weight of the additive resin and the filler material is 60% or less.

7. An article of manufacture which includes a melt-blended resin composition as in claim 5 or 6.

8. A molded article which consists essentially of a melt-blended resin according to claim 5 or 6.

* * * * *

UNITED STATES PATENT AND TRADEMARK OFFICE
CERTIFICATE OF CORRECTION

PATENT NO. : 5,225,471

DATED : July 6, 1993

INVENTOR(S) : Tajima et al

It is certified that error appears in the above-identified patent and that said Letters Patent is hereby corrected as shown below:

Column 1, line 55, after "of" insert --the--.

Column 2, line 46, change " $\delta_1 < \delta_3 < \delta_2$ " to -- $\delta_1 > \delta_3 > \delta_2$ --.

Column 3, line 14, after "in" insert --a--;
    line 18, after "is" insert a comma (,);
    line 24, delete "mat®rial" and insert --material--;
    line 59, after "particles" insert --are--.

Column 4, line 68, after "flaky" delete "filer" and insert --filler--.

Column 5, line 2, after "of" delete "them" and insert --the same--.

Column 6, line 2, after "angle" delete "was" and insert --is--;

line 45, delete "Duration" and insert --Duracon-- and change "polyplas-" to --Polyplas--.

Column 7, line 1, after "reference" insert a ")";
    line 52, after "see" delete "an" and insert --the--.

Column 8, line 2, after "structure" insert a comma and after "however" insert a comma;
    line 15, change "particle" to --particles-- and change "was" to --were--;
    line 21, after "that" delete "a";
    line 22, Change "particle" to --particles--;
    line 25, delete "a";
    line 26, change "particle" to --particles--;
    line 30, change "particle" to --particles--;
    line 55, change "A,a" to --A, a--.

UNITED STATES PATENT AND TRADEMARK OFFICE
CERTIFICATE OF CORRECTION

PATENT NO. : 5,225,471

DATED : July 6, 1993

INVENTOR(S) : TAJIMA et al

It is certified that error appears in the above-identified patent and that said Letters Patent is hereby corrected as shown below:

Column 11, line 32, change "value" to --values,--;
        line 55, before "is" insert --which--;
        line 61, before "is" insert --which--.

Column 12, line 41, before "is" insert --which--;
        line 46, before "is" insert --which--;
        line 48, after "filler" delete "is" and insert --of--.

Signed and Sealed this

Thirtieth Day of August, 1994

Attest:

BRUCE LEHMAN

Attesting Officer      Commissioner of Patents and Trademarks